United States Patent
Lu et al.

(10) Patent No.: US 8,830,389 B2
(45) Date of Patent: Sep. 9, 2014

(54) IMAGE DETECTING MODULE AND LENS MODULE

(75) Inventors: Chien-Hsin Lu, Taipei (TW); Zheng-Yu Wu, Taipei (TW)

(73) Assignee: Ability Enterprise Co., Ltd., Taipei (TW)

(*) Notice: Subject to any disclaimer, the term of this patent is extended or adjusted under 35 U.S.C. 154(b) by 74 days.

(21) Appl. No.: 13/566,520

(22) Filed: Aug. 3, 2012

(65) Prior Publication Data

US 2012/0300103 A1 Nov. 29, 2012

Related U.S. Application Data

(63) Continuation-in-part of application No. 12/704,917, filed on Feb. 12, 2010, now abandoned.

(51) Int. Cl.
*H04N 5/225* (2006.01)
*G02B 23/16* (2006.01)

(52) U.S. Cl.
CPC ........... *H04N 5/2253* (2013.01); *H04N 5/2257* (2013.01)
USPC ............................. 348/374; 348/340; 359/513

(58) Field of Classification Search
USPC .......... 348/335, 340, 373, 374, 376; 359/513, 359/703, 704
See application file for complete search history.

(56) References Cited

U.S. PATENT DOCUMENTS

| | | | |
|---|---|---|---|
| 6,483,030 B1 | 11/2002 | Glenn et al. | |
| 6,918,673 B2 | 7/2005 | Johnson et al. | |
| 7,110,787 B2 * | 9/2006 | Chen | 455/550.1 |
| 7,332,712 B2 | 2/2008 | Webster | |
| 7,365,915 B2 | 4/2008 | Tsai | |
| 7,663,694 B2 | 2/2010 | Kurosawa | |
| 7,903,170 B2 | 3/2011 | Ishimaru | |
| 2001/0012073 A1 | 8/2001 | Toyoda et al. | |
| 2005/0043058 A1 * | 2/2005 | Chen | 455/556.1 |
| 2006/0221225 A1 | 10/2006 | Tsukamoto et al. | |
| 2007/0101796 A1 | 5/2007 | Tsai | |
| 2008/0094497 A1 * | 4/2008 | Ishimaru | 348/335 |
| 2008/0186598 A1 | 8/2008 | Tsuchiya | |
| 2008/0266447 A1 | 10/2008 | Ohara et al. | |
| 2008/0297651 A1 | 12/2008 | Urakami et al. | |
| 2011/0044679 A1 * | 2/2011 | Yoshida et al. | 396/133 |
| 2011/0063450 A1 | 3/2011 | Go | |
| 2011/0134307 A1 | 6/2011 | Lee et al. | |
| 2011/0141335 A1 | 6/2011 | Cheng et al. | |
| 2011/0234890 A1 * | 9/2011 | Kobayashi et al. | 348/373 |
| 2013/0265470 A1 * | 10/2013 | Liu et al. | 348/294 |

FOREIGN PATENT DOCUMENTS

| | | |
|---|---|---|
| JP | 2006038885 | 2/2006 |
| JP | 2006067356 | 3/2006 |
| JP | 2006211438 | 8/2006 |
| JP | 2006222501 | 8/2006 |
| JP | 2008124673 | 5/2008 |
| JP | 2008148253 | 6/2008 |
| JP | 2008191332 A * | 8/2008 |
| JP | 2009071631 | 4/2009 |

* cited by examiner

*Primary Examiner* — John Villecco
(74) *Attorney, Agent, or Firm* — McClure, Qualey & Rodack, LLP

(57) ABSTRACT

An image detecting module includes a socket, a circuit board, an image sensor, an elastic element, a filter and a holder. The socket comprises an inner circumference wall along a main axis for defining an inner space and a platform that extended from the inner circumference wall. Pluralities of mounting holes are provided on the holder and pluralities of protrusions are provided on the socket; thus the elastic element and the filter could be fixed between the platform and the holder by fitting the protrusions into the mounting holes.

15 Claims, 7 Drawing Sheets

IMAGE DETECTING MODULE AND LENS MODULE

This application is a continuation-in-part application of co-pending U.S. application Ser. No. 12/704,917, filed Feb. 12, 2010, the contents of which are incorporated herein by reference.

BACKGROUND OF THE INVENTION

1. Field of the Invention

The present invention relates to a lens module, and more particularly, to a lens module of digital camera formed with components such as the filter being fixed on a stand-alone socket using the holder.

2. Description of the Prior Art

Currently on the market, mobile phones (or cell phones) with photo-taking function, digital cameras, and video cameras are all deployed with a lens module. A lens module consists essentially of a lens group, a lens barrel, and an image sensor. FIG. 1 is a views of lens module of the conventional prior art. The lens module consists of the lens group 81, lens barrel 82, and image sensor 83. The lens group 81 are placed inside the lens barrel 82 and include a lens 811 used for focalization and a filter 812 for eliminating specific optical frequency. The image sensor 83 is equipped on one side of the lens barrel 82 and includes one transparent cover plate 831, an image sensing chip 832, and one base board 833.

As shown in FIG. 1, the image sensing chip 832 is fixed on the base board 833 and further packaged between the transparent cover plate 831 and the base board 833 by using the transparent cover plate 831. Thus, the optical image signal entering the lens barrel 82 is firstly focalized through the lenses 811, is filtered by the filter 812, and then passes through the transparent cover plate 831 to the image sensing chip 832. The image sensing chip 832 further converts the optical image signal to the electronic image signal.

For the lens module described above, since an area 821 is to be provided by the lens barrel 82 for placing the filter 812 and the lens barrel 82 is made of plastic, it is easier for the assembly to occupy more space and become heavier. Hence, if the filter placement area 821 can be saved, the lens module can thus become thinner.

Referring to FIG. 2, which is a view of another lens module of the prior art. The lens module comprises a socket 91, a lens unit 92 screwed into the socket 91, an elastic element 93 inserted in the socket 91, a filter 94 fixed inside the socket 91, an image sensing chip 95, and a circuit board 96. This method of assembly allows the lens module to become thinner, but the filter 94 needs to be dispensed to be fixed on the socket 91 and thus the assembling process will be non-reversible. In the actual production process, the assembly may be re-processed because of the tilted optical axis. In the re-assembling process, the filter 94 dispensed and fixed on the socket 91 will be damaged and the cost is thus increased.

SUMMARY OF THE INVENTION

In view of the above, one object of the present invention is to provide a lens module in which the filter is placed on a stand-alone socket to avoid the deployment of filter placement area inside the lens barrel, wherein the thickness is effectively reduced and the lens module becomes thinner.

Another object of the present invention is to provide a lens module in which a holder is utilized to fix the filter on the stand-alone socket. The holder allows the lens module to be reassembled, facilitates the assembling process, and raises the yield of assembly.

Still another object of the present invention is to provide a lens module in which a holder is used to fix the filter on the stand-alone socket. When the lens module is de-assembled, damages to the filter and the socket can be prevented by using such method and the production cost can thus be effectively reduced.

According to the above objects, the present invention provides an image sensing module, which includes a socket, a circuit board, an image sensor, an elastic element, a filter, and a holder. The socket comprises a circumference wall that is formed around an axis and defines an accommodating space and a supporting platform that extends from the circumference wall to the accommodating space. The socket is disposed with a plurality of fastening protrusions and the holder has a plurality of holes for being engaged by the plurality of fastening protrusions, and thus the aforementioned elastic element and the filter are fixed on the supporting platform of the socket.

Moreover, the present invention provides a lens module which includes a lens group, a lens barrel, and an image sensing module. The lens group is disposed inside the lens barrel and an image sensing module is disposed on one side of the lens barrel. The image sensing module includes a socket, a circuit board, an image sensor, an elastic element, a filter, and a holder. The socket comprises a circumference wall that is formed around an axis and defines an accommodating space and a supporting platform that extends from the circumference wall to the accommodating space. The socket is disposed with a plurality of fastening protrusions and the holder has a plurality of holes for being engaged by the plurality of fastening protrusions. Thus the aforementioned elastic element and the filter are fixed on the supporting platform of the socket.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

For a comprehensive and clear disclosure of technical contents, the purpose of invention, and the achieved effects, the detailed description taken in conjunction with the drawings and drawing No. is shown below.

Figure 1:
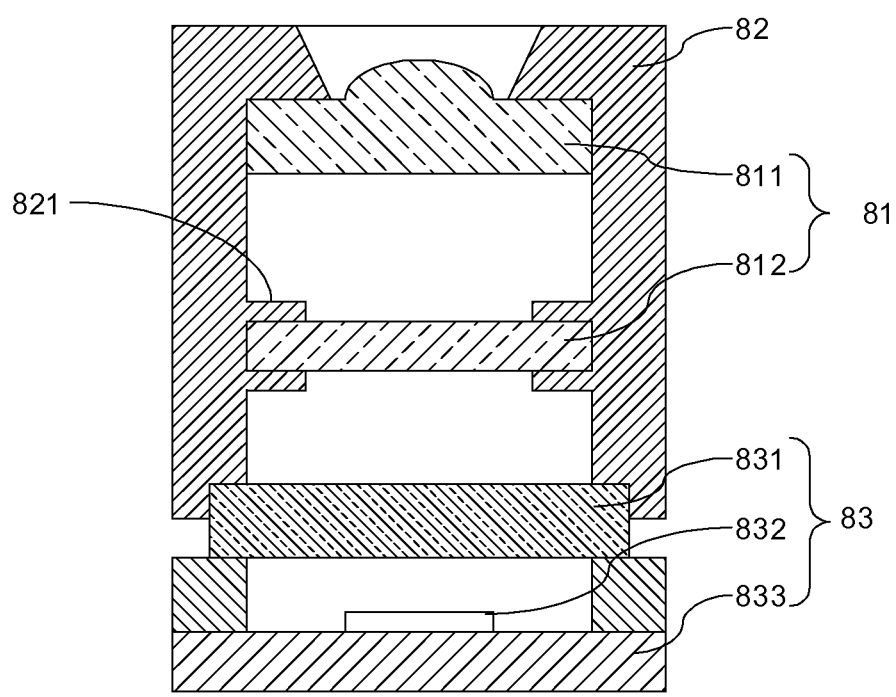
FIG. 1 is a cross-sectional view of a lens module of the prior art.
Figure 2:
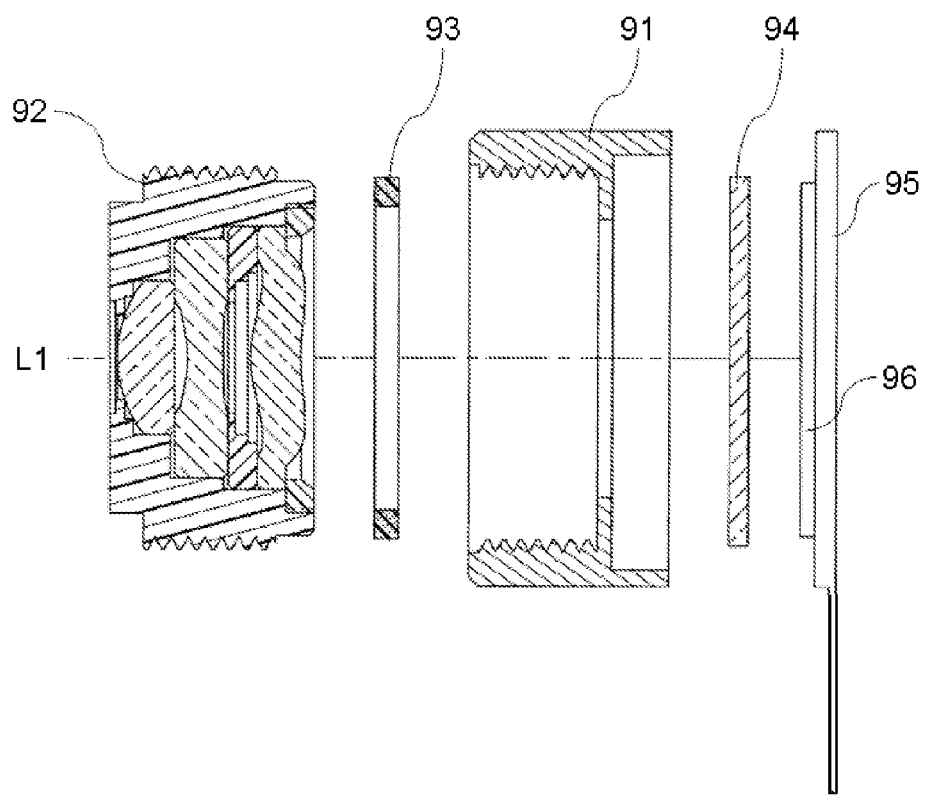
FIG. 2 is a cross-sectional view of another lens module of the prior art.
Figure 3:
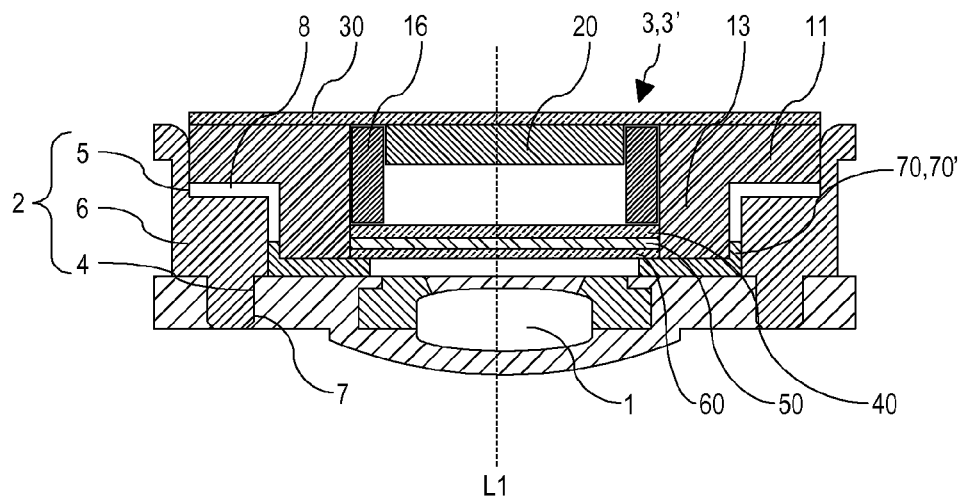
FIG. 3 is a cross-sectional view of a lens module of the present invention.

First, referring to FIG. 3, a lens module of the present invention includes a lens group 1, a lens barrel 2, and an image sensing module 3, 3'. The lens barrel 2 comprises a first circumference wall 4 formed around an axis L1, a second circumference wall 5 formed around the same axis L1 as the first circumference wall 4, and a shoulder 6 connecting the first circumference wall 4 to the second circumference wall 5. The above-mentioned first circumference wall 4 encloses the first accommodating space 7 for containing the lens group 1, and the second circumference wall 5 encloses the second accommodating space 8 larger than the first vacant space 7 for containing the image sensing module 3, 3'. The image sensing module 3, 3' is fixed to the shoulder 6 between the first circumference wall 4 and second circumference wall 5 by lock-fasteners such as screws. Besides, the image sensing module 3, 3' are different embodiments of the present invention and the difference lies in the structure of the holder 70, 70'. This will be described in detail in the following.

Figure 4:
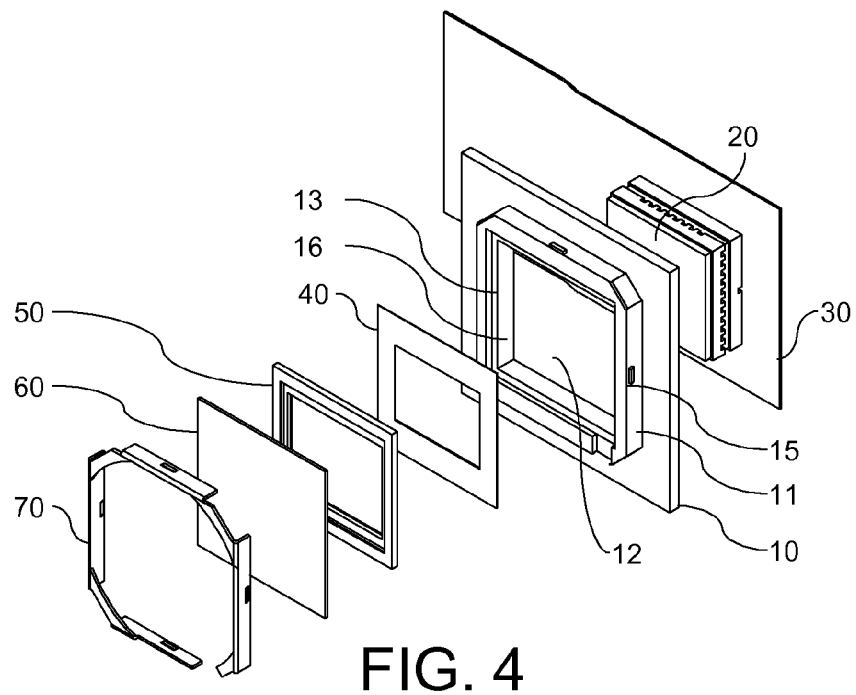
FIG. 4 is an exploded view of the first embodiment of the image sensing module of the lens module of the present invention.
Figure 5:
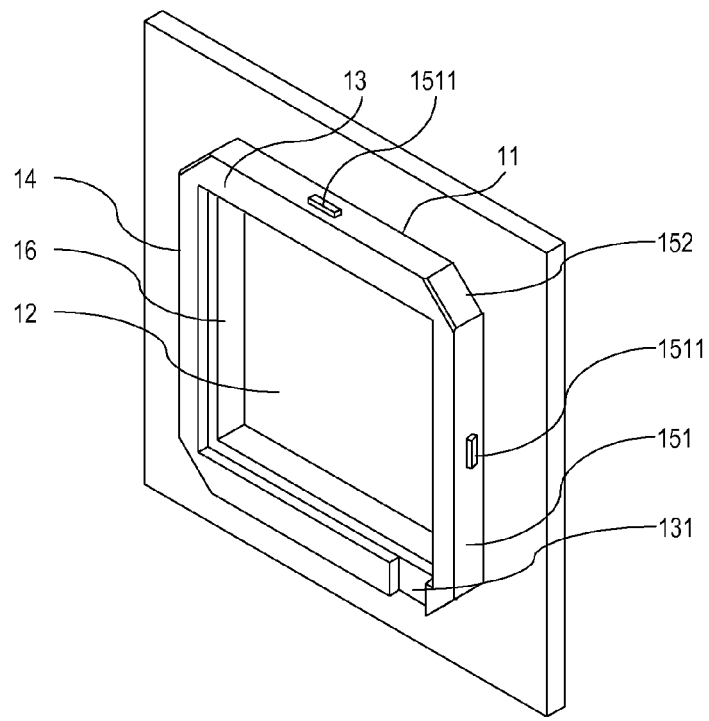
FIG. 5 is a view of the socket of the image sensing module of the first embodiment.
Figure 6:
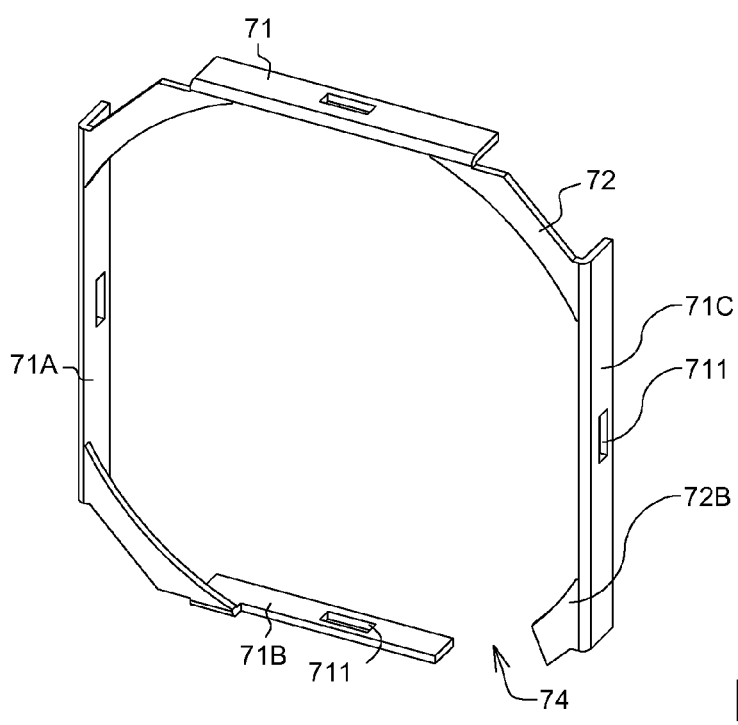
FIG. 6 is a view of the holder of the image sensing module of the first embodiment.
Figure 7:
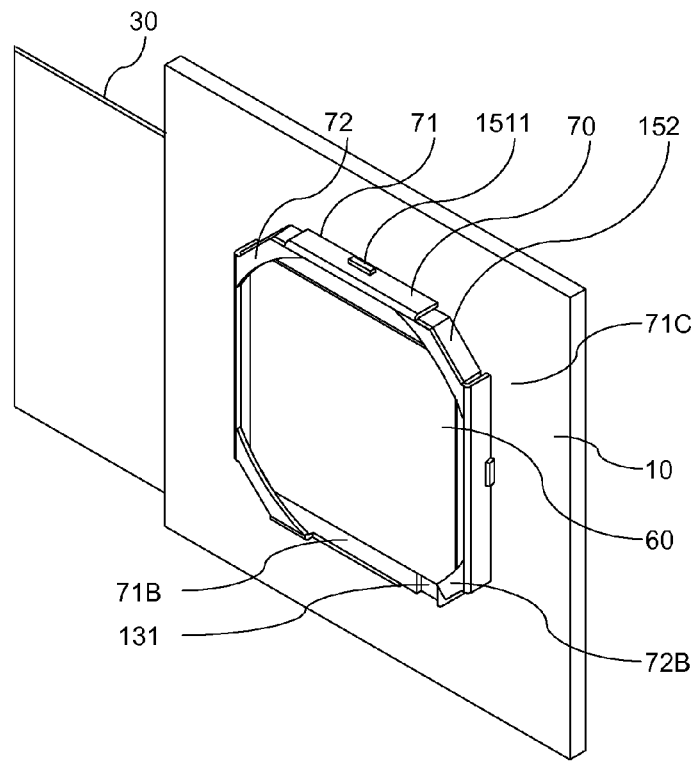
FIG. 7 is a view of the completed assembly of the image sensing module of the first embodiment.

FIG. 4 is an exploded view of the first embodiment of the image sensing module 3 of the lens module as shown in FIG. 3. FIG. 5 is a view of the socket 10 of the image sensing module 3 of the first embodiment. FIG. 6 is a view of the holder 70 of the image sensing module 3 of the first embodiment. FIG. 7 is a view of the completed assembly of the image sensing module 3 of the first embodiment. The structure of the image sensing module 3 of the present invention will be described in detail in the following.

The image sensing module 3 of the first embodiment comprises a socket 10, an image sensor 20 disposed in the rectangular opening 12 of the socket 10, a circuit board 30 electrically connected to the image sensor 20, a shading sheet 40, an elastic element 50, a filter 60, and a holder 70.

The socket 10 comprises a base plate 11 on which a hollowed-out rectangular opening 12 is formed by the octagonal barrel portion 13 with four corners being cut out, wherein the barrel portion 13 comprises an inner sidewall 14 surrounding the same axis L1 as the lens barrel 2 of the lens module and an outer sidewall 15 on the other side of the inner sidewall 14. Therefore, the barrel portion 13 of the image sensing module 3 of the first embodiment includes four sides 151 and three bevels 152 connecting to the sides 151. The above-mentioned inner sidewall 14 and the rectangular opening 12 form an accommodating space; therefore, when the circuit board 30 is dispensed to be fixed below the socket 10, the image sensor 20 on the circuit board 30 can be placed in the accommodating space formed by the inner sidewall 14 and the rectangular opening 12. Moreover, a plurality of rectangular supporting platforms 16 (one pair at least with each supporting platform 16 on the opposite side for example) can be further disposed on the inner sidewall 14 of the barrel portion 13, wherein the height of supporting platform 16 is smaller than that of the barrel portion 13 so that a platform can be formed with the difference of height between the barrel portion 13 and the supporting platform 16 and that the shading sheet 40, elastic element 50, and filter 60 can be placed on the supporting platform 16. Furthermore, another accommodating space can also be formed between the inner part of the supporting platform 16 and the rectangular opening 12. When the inner sidewall 14 of the barrel portion 13 is disposed with the supporting platform 16, the image sensor 20 can be placed inside the accommodating space inside the supporting platform 16 depending on the requirements of the design. Furthermore, at least one of the four sides 151 of the outer sidewall 15 of the barrel portion 13 is disposed with fastening protrusions 1511, or two opposite sides 151 are disposed with fastening protrusions 1511, and other opposite sides 151 may disposed with one fastening protrusion 1511. In another embodiment, at least one side 151 and/or at least one bevel 152 of the barrel portion 13 is disposed with at least one fastening protrusion 1511.

FIG. 6 is a view of the holder of the image sensing module of the first embodiment of the present invention. As shown in FIG. 6, the holder 70 is a hollowed-out octagonal structure with an opening 74, four sides 71 of which are parallel to the four sides 151 of the outer sidewall 15 of the socket 10, but one side 71B of which is shorter than the other three sides 71A due to the opening 74. Holes 711 are disposed respectively near the center of each of the four sides 71 of the holder 70 to be engaged by the fastening protrusions 1511 on the outer sidewall 15 of the socket 10 for the holder 70 and the socket 10 to be firmly assembled together. Moreover, flanges 72 perpendicular to the sides 71 extend respectively between the four sides 71 (i.e. three corners of the holder 70), and only one side of the shorter side 71B is disposed with the flange 72 and the other side is a free end or open end. Therefore, the end of one side 71C among the three sides 71A is not connected to the shorter side 71B, and a short flange 72B extends from the open end of the side 71C. Each of the above four sides 71 has a hole 711 which is used for being engaged by the fastening protrusion 1511 of the socket 10 for the holder 70 and the socket 10 to be firmly assembled. When the holder 70 is assembled with the socket 10, the above four flanges 72, 72B can be used to press the shading sheet 40, the elastic element 50, and the filter 60 for the shading sheet 40, the elastic element 50, and the filter 60 to be placed between the flanges 72, 72B and the supporting platform 16 of the socket 10. In an embodiment, the shorter flange 72B and the shorter side 71B are disconnected to form the opening 74.

In the embodiment above, the image sensor 20 can be Complementary Metal-Oxide-Semiconductor (CMOS) or Charge-Coupled Device (CCD) image sensor and the circuit board 30 can be a Flexible Printed Circuit (FPC). The elastic element 50 can be made of a kind of high polymer material to make sure the image sensor 20 is not influenced by dust or mist. Moreover, the filter 60 can be used to absorb red light, infrared light, or lights of which the wavelengths are close to that of the infrared light. Additionally, the holder 70 of the present invention can be made of metal and formed by stamping or made of engineering plastics and formed by injection molding, which is not limited in the present invention.

As shown in FIG. 4, the shading sheet 40, the elastic element 50, and the filter 60 are placed sequentially on the supporting platform 16, and the holder 70 is used to fasten these components to the socket 10 and fixed between the supporting platform 16 and the flanges 72, 72B of the holder 70. The image sensor 20 is first fixed on the circuit board 30 by employing surface adhering technique, and then the circuit board 30 is dispensed to be fixed behind the socket 10. Thus, the image sensor 20 can be placed inside the supporting platform 16 and be assembled into the image sensing module 3 as shown in FIG. 7. The image sensing module 3 is further fixed to the shoulder 6 as shown in FIG. 3 with lock-fasteners such as the screws (omitted in the figure) for the image sensing module 3 to be placed in the second accommodating space 8.

Apparently, due to the suitable design of the holder 70, the total thickness is approximately equivalent to the depth of the side 71; and the width of the side 71 of the holder 70 can be designed as slightly smaller than the width of the outer sidewall 15 of the socket 10 so that the fastening protrusions 1511 passing through the holes 711 respectively can be protruded out of the sides 71 of the holder 70. Additionally, as the image sensor 20 is placed in the accommodating space inside the supporting platform 16 of the socket 10, the total thickness of the image sensing module is roughly the sum of the thickness of the socket 10 and that of the circuit board 30, and the thickness of the image sensing module 3 can be effectively reduced, which allows the lens to be thinner. Furthermore, the holder 70 is buckled with the socket 10 through lock-fasteners, and thus the lens module can be repeatedly re-assembled and more easily assembled, and the yield of assembly can also be raised.

Furthermore, a recess 131 can be further formed on one side of the octagonal barrel portion 13 in the first embodiment. As FIG. 5 shows, a recess 131 is formed on one side of the octagonal barrel portion 13, and the side on which the recess 131 is located is parallel to the shorter side 71B of the holder 70. Thus when the holder 70 is fixed on the octagonal barrel portion 13, the recess 131 corresponding to the opening 74 will be exposed. The purpose for designing the recess 131 is to provide a channel through which the control lines of the image sensor 20 can pass, as shown in FIG. 7.

Figure 8:
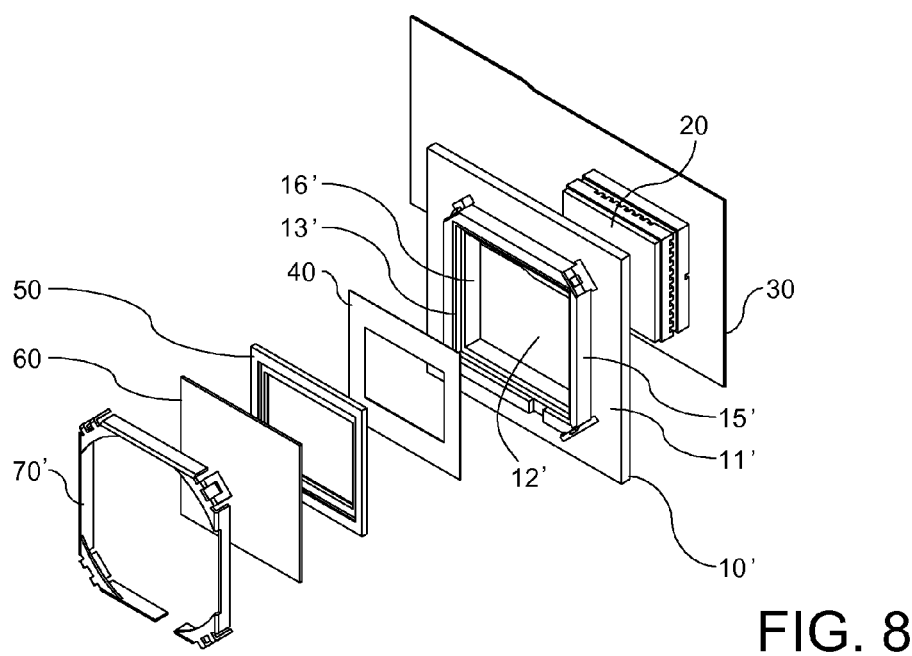
FIG. 8 is an exploded view of the second embodiment of the image sensing module of the lens module of the present invention.
Figure 9:
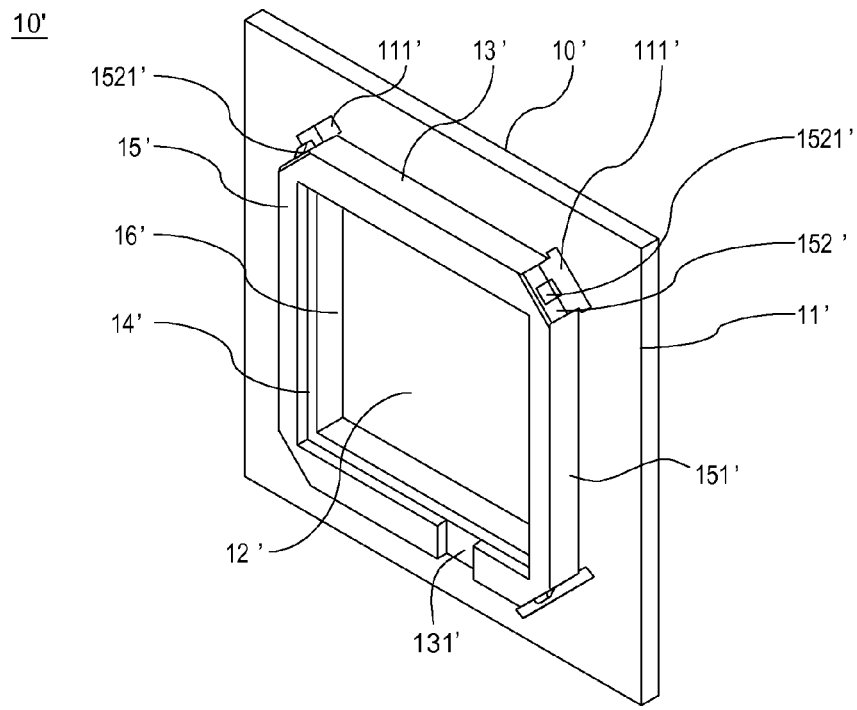
FIG. 9 is a view of the socket of the image sensing module of the second embodiment.
Figure 10:
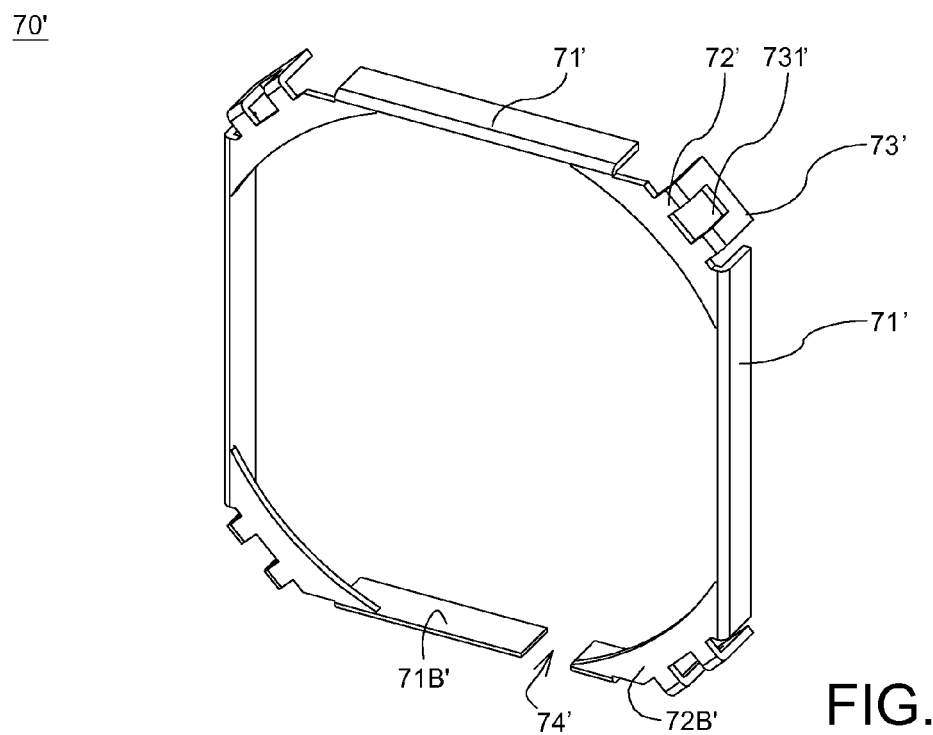
FIG. 10 is a view of the holder of the image sensing module of the second embodiment.
Figure 11:
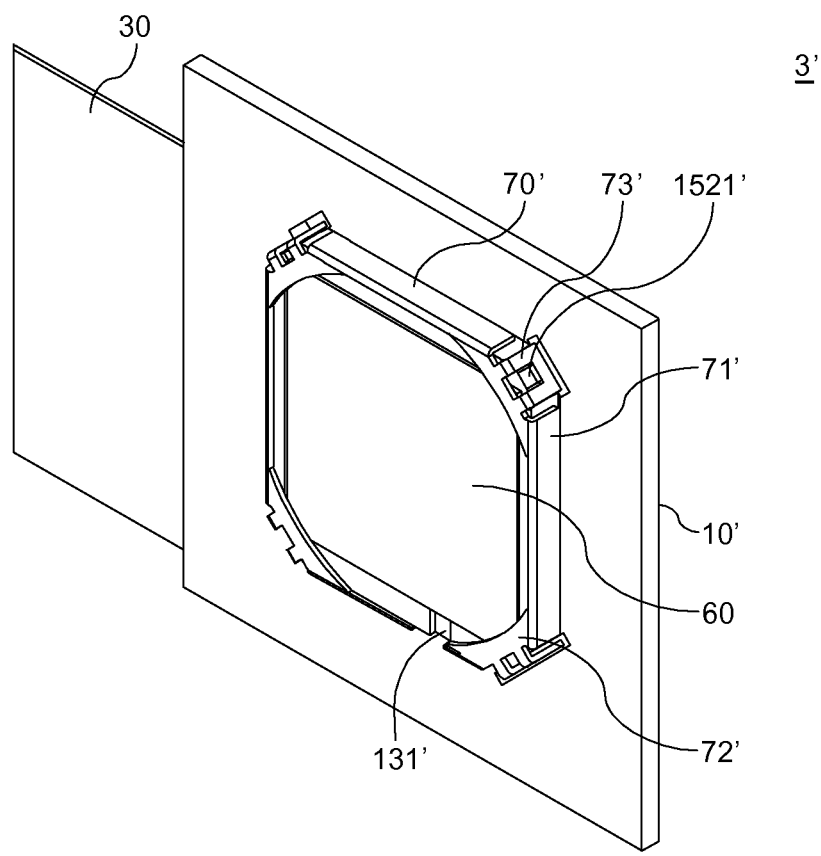
FIG. 11 is a view of the completed assembly of the image sensing module of the second embodiment.

Referring then to FIG. 8, which is an exploded view of the second embodiment of image sensing module 3' of the lens module as shown in FIG. 3. FIG. 9 is a view of the socket of the image sensing module 3' of the second embodiment. FIG. 10 is a view of the holder of the image sensing module 3' of the second embodiment. FIG. 11 is a view of the completed assembly of the image sensing module 3' of the second embodiment.

The image sensing module 3' of the second embodiment, similar to the image sensing module 3 of the first embodiment, includes a socket 10', an image sensor 20 disposed in the rectangular opening 12' of the socket 10, a circuit board 30 electrically connected to the image sensor 20, a shading sheet 40, an elastic element 50, a filter 60, and a holder 70'.

Referring to FIG. 9, the socket 10' of the image sensing module 3' of the second embodiment, being similar to the socket 10 of the first embodiment, comprises a base plate 11', on which is disposed with a rectangular hollowed-out opening 12' formed by the surrounding of the octagonal barrel portion 13' with four corners being cut out, wherein the barrel portion 13' consists of an inner sidewall 14' surrounding the same axis as the lens barrel 2 of the lens module and an outer sidewall 15' on the other side of the inner sidewall 14'. The difference between the second embodiment and the first embodiment lies in that a fastening protrusion 1521' is disposed on at least one of the four bevels 152'. In another embodiment, the fastening protrusions 1521' can be disposed on at least two of the bevels 152', at least two of the sides 151' or at least one of the bevels 152' and at least one of the sides 151'. At the position on the base 11' of the socket 10 opposite to the aforementioned fastening protrusions 1521', i.e. the projected position of the fastening protrusions 1521' on the base 11', a through hole 111' is disposed to allow the flange 73' of the holder 70' to buckle into. Moreover, a plurality of rectangular supporting platforms 16' (one pair at least with each supporting platform on the opposite side for example) can be further placed on the inner sidewall 14' of the barrel portion 13' in the present embodiment, wherein the height of the supporting platform 16' is smaller than that of the barrel portion 13' so that a platform can be formed due to the difference of height between the barrel portion 13' and the supporting platform 16 and the shading sheet 40, elastic element 50, and filter 60 can thus be placed on the supporting platform 16'. Meantime, an accommodation space can also be formed by the inner part of the supporting platform 16' and the rectangular opening 12'. Depending on the requirement of the design, when the inner sidewall 14' of the barrel portion 13' is disposed with a supporting platform 16', the image sensor 20 will be placed inside the accommodating space inside the supporting platform 16'. As shown in FIG. 9, a recess 131' is formed on one side of the octagonal barrel portion 13'. When the holder 70' is fixed on the octagonal barrel portion 13', the recess 131' corresponding to the opening 74' will be exposed.

Referring to FIG. 10, the holder 70' is an hollowed-out octagonal-shaped structure with an opening 74' to correspond with the design of the outer sidewall 15' of the barrel portion 13' and comprises four sides 71' but one side 71B' is shorter than the other three side 71'. The four sides 71' are parallel to the side 151' of the outer sidewall 15' of the socket 10' and connect among one another through the first flange 72' perpendicular to and extending from the sides 71'. The first flange 72' is one bevel of the octagonal structure and is used to press the shading sheet 40, the elastic element 50, and the filter 60 for the shading sheet 40, the elastic element 50, and the filter 60 to be placed between the first flange 72' and the supporting platform 16' of the socket 10'. A second flange 73' parallel to the bevel 152' of the outer sidewall 15' extends from the middle of the first flange 72', and each of the second flanges 73' is vertical to the bevel and has a hole 731'. The second flanges 73' can enter the first through hole 111' of the socket 10', and the fastening protrusions 1521' of the socket 10' can engage with the hole 731' on the second flange 73' and are protruded out the bevels of the holder 70', allowing the holder 70' and the socket 10' to be firmly assembled. In an embodiment, the shorter flange 72B' and the shorter side 71B' are disconnected to form the opening 74'.

The image sensor 20, the elastic element 50, the filter 60, and the holder 70' of the second embodiment are made of the same material in the same method as those of the first embodiment and thus the manufacturing method is not described in detail. Similarly, the shading sheet 40, the elastic element 50, and the filter 60 are sequentially placed on the supporting platform 16' and buckled into the socket 10' via the holder 70' for being fixed between the supporting platform 16' and the first flange 72' of the holder 70'. The image sensing module 3' is assembled as shown in FIG. 11, wherein the image sensor 20 is first fixed on the circuit board 30 by employing surface adhering technique, and then the circuit board 30 is dispensed to be fixed behind the socket 10'. The image sensing module 3' is further fixed on the shoulder 6 as shown in FIG. 3 with lock-fasteners such as the screws (omitted in the figure) to be placed in the second accommodating space 8. As the present embodiment differs from the first embodiment only in changes of the design of the barrel portion 13' and of the holder 70', the effects achieved by the present embodiment is the same as those achieved by the first embodiment.

In addition to the two embodiments described above, the image sensing module of the present invention can also one which includes the aforementioned image sensing module but excludes the shading sheet 40, namely, an image sensing module that includes only a socket 10, 10', an image sensor 20, a circuit board 30, an elastic element 50, a filter 60, and one holder 70, 70', or an image sensing module that includes only a socket 10, 10', an image sensor 20, a circuit board 30, a filter 60, and one holder 70, 70'. Moreover, in the image sensing module 3, 3' of the present invention, the fastening protrusions 1511, 1521' can also be disposed on the holder 70, 70' and the holes 711, 731' can be disposed on the socket 10, 10', and the holder 70, 70' and the socket 10, 10' can still be firmly assembled. That is, the fastening protrusions 1511, 1521' can be disposed on at least one of sides 71, 71', at least one of flanges 72, 72' or at least one of the sides 71, 71' and at least one of the flange 72, 72'.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image sensing module comprising:
   a circuit board;
   an image sensor;
   a socket; and
   a filter, said filter is fixed on said socket by a holder, wherein said holder is an octagonal hollowed-out structure with an opening;
   wherein said holder and said socket comprise a plurality of holes and a plurality of fastening protrusions respectively, and said holes and said fastening protrusions being able to be engaged with one another;
   wherein said holder comprises four first sides and four flanges, three of said flanges are connected between two neighboring sides of said four first sides, one first side is shorter than the other three first sides and one flange is shorter than the other three sides, said shorter flange and said shorter side are disconnected to form said opening, and said socket comprises four second sides and four bevels corresponding to said four first sides and said four flanges.

2. The image sensing module according to claim 1, wherein said fastening protrusions are disposed on at least two of said bevels, at least two of said second sides, or at least one of said bevels and at least one of said second sides.

3. The image sensing module according to claim 1, wherein said fastening protrusions are disposed on at least two of said flanges, at least two of said first sides, or at least one of said flange and at least one of said first sides.

4. The image sensing module according to claim 1, further comprising:
   a shading sheet, disposed between said image sensor and said filter; and
   an elastic element, disposed between said shading sheet and said filter.

5. An image sensing module, including an image sensor, said image sensing module comprising:
   a filter;
   a socket, carrying said filter; and
   a holder, fixing said filter on said socket, wherein said holder is an octagonal hollowed-out structure with an opening;
   wherein said holder and said socket comprise at least one fastening protrusion and at least one hole respectively, and said fastening protrusion and said hole being able to be engaged with one another;
   wherein said holder comprises four first sides and three flanges, said flanges are connected between two neighboring sides of said four sides, and one first side is shorter than the other three first sides, and said socket comprises four second sides and three bevels corresponding to said four first sides and said three flanges.

6. The image sensing module according to claim 5, wherein said holder further comprises a shorter flange shorter than said other three flanges, and said shorter flange and said shorter side are disconnected to form said opening, and said socket comprises a fourth bevel corresponding to said shorter flange.

7. The image sensing module according to claim 5, wherein said fastening protrusion is disposed on at least one of said bevels or at least one of said second sides, or said fastening protrusion is disposed on at least one of said flanges or at least one of said first sides.

8. The image sensing module according to claim 7, wherein said fastening protrusion is disposed on said socket, and at least one through hole is disposed on a base of said bevels opposite to a projected position of said fastening protrusion on said base to buckle at least one of said flanges.

9. The image sensing module according to claim 5, wherein said fastening protrusion passing through said hole respectively.

10. The image sensing module according to claim 5, further comprising a shading sheet disposed between said image sensor and said filter.

11. The image sensing module according to claim 10, further comprising an elastic element disposed between said shading sheet and said filter.

12. An image sensing module, comprising:
    a socket, on which is disposed with an accommodating space, said accommodating space being formed by a barrel portion and a supporting platform disposed inside said barrel portion, and a recess being formed on a side of said barrel portion;
    an image sensor, disposed inside said accommodating space formed by said supporting platform of said socket;
    a circuit board, assembled with said socket and said image sensor;
    a filter, disposed on said supporting platform of said socket; and
    a holder, wherein said holder and said socket respectively comprise at least one fastening protrusion and at least one hole for being engaged by said fastening protrusion to fix said filter on said socket, wherein said holder is an octagonal hollowed-out structure with an opening corresponding to said recess of said barrel portion;
    wherein said holder comprises four first sides and three flanges, said flanges are connected between two neighboring sides of said four sides, and one first side is shorter than the other three first sides, and said socket comprises four second sides and three bevels corresponding to said four first sides and said three flanges.

13. The image sensing module according to claim 12, wherein said fastening protrusion is disposed on at least one of said bevels or at least one of said second sides, or said fastening protrusion is disposed on at least one of said flanges or at least one of said first sides.

14. The image sensing module according to claim 13, wherein said fastening protrusion is disposed on said socket, and at least one through hole is disposed on a base of said bevels opposite to a projected position of said fastening protrusion on said base to buckle at least one of said flanges.

15. The image sensing module according to 12, further comprising:
    a shading sheet, disposed between said image sensor and said filter; and
    an elastic element, disposed between said shading sheet and said filter.

* * * * *